Nov. 8, 1932.  F. DALCHOW  1,886,531
METHOD AND DEVICE TO DIRECT THE SHOOTS OF YOUNG TREES
Filed May 14, 1930
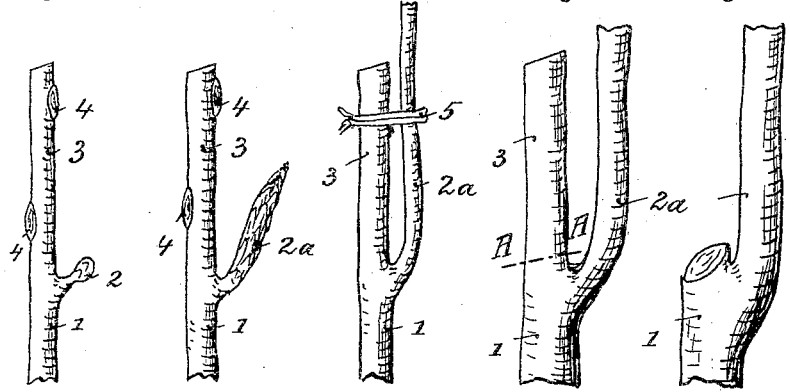
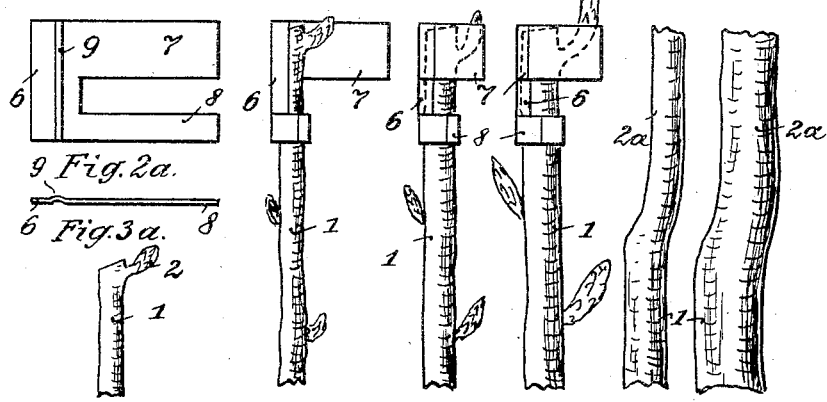
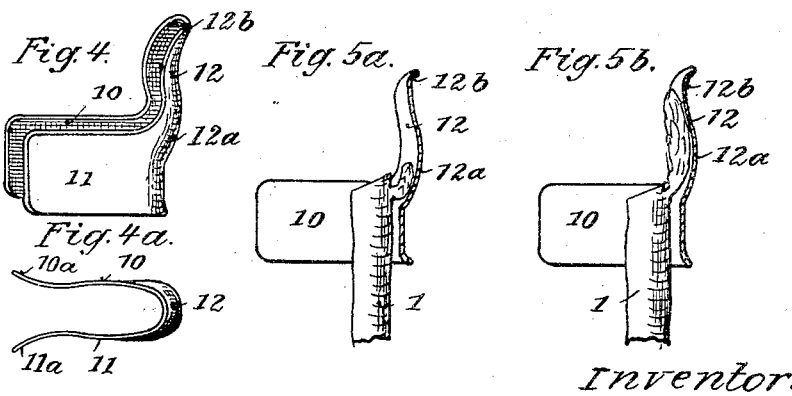
Inventor:
Franz Dalchow Patented Nov. 8, 1932

1,886,531

UNITED STATES PATENT OFFICE

FRANZ DALCHOW, OF NAUEN, NEAR BERLIN, GERMANY

METHOD AND DEVICE TO DIRECT THE SHOOTS OF YOUNG TREES

Application filed May 14, 1930, Serial No. 452,281, and in Germany May 14, 1929.

The invention relates to a new method to direct the shoots of young trees and it aims to replace the heretofore used method in which the shoot had to be fixed to a peg of the stem of the tree. The heretofore used method shows a number of disadvantages well known to the expert. These disadvantages are completely overcome by the improved method and considerable advantages are also attained.

The essential feature of the new method consists in that the stem of the tree is cut at first directly above the shoot intended for the prolongation. Hereafter the direction, in which the prolongation of said shoot shall grow, is influenced by a rail attached to the stem. To carry out the said method one can use various means, for instance a strap consisting of soft material for instance lead, which is attached to the stem and bound around the bud of the shoot or around the already growing shoot. But it is specially advantageous to use a peculiarly formed brace combined with a clamp and held to the stem by means of the latter.

The drawing shows in Figs. 1a–1e the heretofore used method in which a peg has been used.

Fig. 2 shows a front view of a band used in the new method.

Fig. 2a shows a side view of said band.

Figs. 3a–3f show the use and effect of said band.

Fig. 4 shows the side view of a brace combined with a clamp serving to carry out the new method.

Fig. 4a shows a plan view of said combined brace and clamp.

Figs. 5a and 5b show the use of the said brace during various periods of the growth of the young shoot.

The heretofore used method (Figs. 1a–1e) was carried out in the way that the stem was cut a good hand's breadth above the bud 2 intended for the prolongation and a peg 3 remained above the bud 2. The buds 4 of the peg were cut out and the bud 2 growing the shoot then began strongly to force and to develop into a shoot 2a (Fig. 1c) which was bound to the peg 3 by a bast band 5. If the shoot 2a was sufficiently grown the band 5 was removed and the peg 3 cut according to line A—A of Fig. 1d so that the young tree came to look as shown in Fig. 1e. At the cutting of the peg 3 it often happened that the new shoot was injured and thereby hindered in its growth.

According to the new method the stem 1 is cut directly above the bud intended for the development of a shoot (Fig. 3a). Hereafter either a band of soft metal is used according to Figs. 2, 2a or a brace in combination with a clamp according to Figs. 4, 4a, 5a and 5b.

The band according to Figs. 2 and 2a is preferably made of thin lead plate. It consists of a part 6 serving as a brace and of the two strips 7 and 8. The brace part 6 is preferably strengthened by a rib 9. By means of the strip 8 the band is attached to the stem 1 in such a way that the part 7 lies in a plane with the bud 2. Hereafter one winds the part 7 around the bud or around the young shoot (Figs. 3b, 3c, 3d). The shoot 2a which develops from the bud 2 is then guided upwards in the direction of the stem. If the tree and with it the shoot 2a begins to grow in its volume strips 7 and 8 made of soft material yield to the natural force of the tree and open so far that the growth of the tree is not hindered.

Still more to the point and more simple in its uses than the band 6, 7, 8 according to Figs. 2, 2a is the clamp according to Fig. 4, 4a. Said clamp consists of the two clamp wings 10, 11 and of the proper brace 12. The wings 10, 11 are bent somewhat outwards at their free ends 10a, 11a, so that the clamp can be easily shifted upon the stem 1 and/or the latter be pressed into the clamp. The brace 12 is somewhat bent out at 12a and besides its upper end 12b is turned preferably to the rear so that the shoot 2a can not be injured by its edge. After the clamp 10, 11 is attached to the stem 1, one compresses but little the free ends of the clamp. The shoot is guided through the brace 12 upwards. If the tree grows in volume then the wings 10, 11 yield selfactingly so that the clamp without further ado drops after some time. But this case only happens if the shoot is already sufficiently long.

The new method shows the hereafter described advantages compared with the heretofore used process.

The work of directing the trees can be done on dormant buds or on very short shoots. The work of directing the shoots can therefore be distributed over a longer period, while under the heretofore used system one had to wait at all events till the shoot was grown long enough to bind the same to the peg. The treatment of the trees while directing the young shoots takes place extraordinarily quick according to the new method, so that considerable time is saved. According to the new process completely straight prolongations are attained and thereby ideally grown trees. As the cutting of the stem is already effected early in spring, naturally the wound is considerably smaller than with the old method as with this method the work could only be started when the trees were considerably grown. The healing method of the cut wound by my new method, falls into the favorable period of the spring growth. As the subsequent removal of the pegs is overcome any possibility to injure the shoots with a knife is prevented. A further advantage of the new method is that it can be worked by unlearned workmen.

I claim:—

1. A method of directing the shoots of young trees consisting in cutting off the stem of the tree directly above the shoot and surrounding the stem adjacent the shoot to loosely support the shoot, and bracing said shoot to direct the same in the direction desired.

2. In a device for directing the shoots of young trees, a clamp of flexible material, means for attaching said clamp to the stem of the tree adjacent the shoot, and means on the clamp loosely engaging the shoot to direct the shoot in the direction desired.

3. In a device for directing the shoots of young trees, a clamp of flexible metal, wings on said clamp adapted to mount said latter to the stem of the tree adjacent the shoot, and a guide on the clamp opposite the shoot for directing the shoot in the direction intended.

4. In a device for directing the shoots of young tree stems a clamp provided with laterally extending tongues on its lower end adapted to form clamping wings for mounting the clamp on the stem, the upper end of the said clamp being shaped to form a guide for directing the shoot in the direction intended.

5. In a device for directing the shoots of young trees a clamp provided with wings for attaching the clamp to the stem of a tree, the rear wall of the clamp being provided with a guide portion for engaging the shoot and for directing the shoot in the direction intended.

In testimony whereof I have hereunto signed my name.

FRANZ DALCHOW.